United States Patent [19]

Eguchi

[11] Patent Number: 5,018,070
[45] Date of Patent: May 21, 1991

[54] REAR WHEEL STEERING CONTROL SYSTEM FOR VEHICLE

[75] Inventor: Takaaki Eguchi, Isehara City, Japan

[73] Assignee: Nissan Motor Co., Ltd., Yokohama, Japan

[21] Appl. No.: 375,630

[22] Filed: Jul. 5, 1989

[30] Foreign Application Priority Data

Jul. 5, 1988 [JP] Japan .................. 63-165934

[51] Int. Cl.$^5$ .......................... B62D 5/04; B62D 5/06
[52] U.S. Cl. ........................ 364/424.05; 364/571.07; 180/79.1; 180/141
[58] Field of Search .............. 364/424.05, 565, 571.07; 180/79.1, 141, 142, 143

[56] References Cited

U.S. PATENT DOCUMENTS

| | | | |
|---|---|---|---|
| 4,666,013 | 5/1987 | Shibahata | 180/141 |
| 4,679,809 | 7/1987 | Ito et al. | 364/425.05 |
| 4,705,130 | 11/1987 | Fukunaga et al. | 180/143 |
| 4,706,979 | 11/1987 | Kawabe et al. | 364/424.05 |
| 4,828,064 | 5/1989 | Furutani et al. | 364/424.05 |
| 4,878,557 | 11/1989 | Shibahata et al. | 364/424.05 |

FOREIGN PATENT DOCUMENTS

| | | |
|---|---|---|
| 0165706A3 | 5/1985 | European Pat. Off. |
| 0254248A1 | 7/1987 | Fed. Rep. of Germany |
| 60-229873(A) | 11/1985 | Japan |
| 2154523A | 9/1985 | United Kingdom |

*Primary Examiner*—Parshotam S. Lall
*Assistant Examiner*—Tyrone Queen
*Attorney, Agent, or Firm*—Foley & Lardner

[57] ABSTRACT

A vehicle control system has a controller comprising a first section for producing a control signal to control the rear wheel steer angle so that the rear wheel steer angle remains equal to a linear combination of a proportional term obtained by multiplying the front wheel steer angle by a proportional coefficient, and a negative derivative term obtained by multiplying the time rate of change of the front wheel steer angle by a derivative coefficient, and a second section which increases the rear wheel steering amount in the direction opposite to the front wheel steering direction by increasing the absolute value of the derivative coefficient with increase in the lateral acceleration of the vehicle or the front wheel steer angle, in order to improve the yawing characteristic of the vehicle in the high lateral acceleration range.

13 Claims, 4 Drawing Sheets

REAR WHEEL STEERING CONTROL SYSTEM FOR VEHICLE

BACKGROUND OF THE INVENTION

The present invention relates to a vehicle steering control system for controlling at least a rear wheel steer angle of a vehicle.

Japanese Patent Provisional Publication No. 60-229873 shows a rear wheel steer angle control system which steers rear wheels of a vehicle so that an actual rear wheel steer angle is given by;

$$\delta_r = K \times \theta - \tau \times \dot{\theta}$$

where $\delta_r$ is the rear wheel steer angle, $\theta$ is a steering angle of the vehicle, $\dot{\theta}$ is a steering angular speed, K is a proportional constant (or coefficient), and $\tau$(tau) is a derivate constant (coefficient). The derivative constant is positive.

Similar rear wheel steer angle control systems are disclosed also in many commonly-assigned, copending U.S. patent applications. Examples are Ser. No. 07/195,085 (, filed by F. SUGASAWA, on May 17, 1988, for "VEHICLE STEER ANGLE CONTROL SYSTEM"), Ser. No. 07/195,078 (, filed by K. MORI, on May 17, 1988, for "SYSTEM FOR CONTROLLING STEER ANGLE OF REAR WHEELS OF FOUR WHEEL STEERABLE MOTOR VEHICLE"), Ser. No. 07/275,061 (, filed by K. KAWAGOE, on Nov. 22, 1988, for "VEHICLE STEERING CONTROL SYSTEM WITH DERIVATIVE GAIN ADJUSTING CAPABILITY"), Ser. No. 07/277,745 (, filed by K. MORI et al., on Nov. 30, 1988, for "REAR WHEEL STEER ANGLE CONTROL SYSTEM FOR VEHICLE"), Ser. No. 07/277,744 (, filed by K. MORI et al., on Nov. 30, 1988, for "FOUR-WHEEL STEER CONTROL SYSTEM"), Ser. No. 07/269,698 (, filed by F. SUGASAWA et al. on Nov. 10, 1988, for "METHOD FOR STEERING VEHICLE"), Ser. No. 07/284,414 (, filed by T. EGUCHI et al., on Dec. 14, 1988, for "VEHICLE REAR WHEEL STEER ANGLE CONTROL SYSTEM") and Ser. No. 07/305,023 (filed by F. SUGASAWA, on Feb. 2, 1989, for "FAIL-SAFE STEER ANGLE CONTROL SYSTEM FOR VEHICLE").

The proportional coefficient K and the derivative coefficient tau assume different values in accordance with the make of the vehicle and the vehicle speed. The proportional coefficient K is generally positive. For example, K equals 0.38, and minus tau equals $-0.049$ when the mass M of the vehicle equals 160 kgS$^2$/m, the yawing moment of inertia I of the vehicle equals 252 kgmS$^2$, the wheelbase 1 equals 2.48 m, and the vehicle speed V equals 120 km/h. However, K $= 0.33$ and minus tau $= -0.056$ for the same vehicle speed, V $= 120$ km/h if M $= 125$ kgS$^2$/m, I $= 227$ kgS$^2$ and 1 $= 2.48$ m.

When the steering wheel is turned speedily, the control system of this type steers the rear wheels so that the rear wheel steer angle remains for a limited time in an opposite phase side in which the rear wheels are steered in the opposite direction to the steering direction of the front wheels, and then changes to a same phase side in which the rear wheels are steered in the same direction as the front wheels (so-called phase inversion control).

However, this control system takes no account of the vehicle lateral acceration in determining a value of the derivative coefficient, so that it cannot improve the vehicle steering response of yawing motion satisfactorily.

In general, it is desired to improve the yawing characteristic of a vehicle in the low vehicle speed range. In the high vehicle speed range, it is desired to improve the stability of the vehicle. In the control system using the above-mentioned equation, the vehicle yawing characteristic is mainly determined by the derivative term $\tau \dot{\theta}$ which is the product obtained by multiplying the steering speed $\dot{\theta}$ by tau. This derivative term acts to increase the opposite phase steering amount through which the rear wheels are steered in the direction opposite to the steering direction of the front wheels, or to reduce the same phase steering amount through which the rear wheels are steered in the same direction as the front wheel steering direction. The derivative term $\tau \dot{\theta}$ increases with increase in the steering speed $\dot{\theta}$, provided that the derivative coefficient tau is fixed. On the other hand, the derivative term increases with increase in the derivative coefficient tau, provided that the steering speed $\dot{\theta}$ is fixed. As the derivative term is increased, the opposite phase steering amount is increased, and accordingly the vehicle yawing characteristic is improved.

The yawing characteristic in the range of low lateral accelerations can be increased by increasing the derivative coefficient tau and thereby increasing the opposite phase steering amount. However, in this case, there appears a momentary lateral acceleration in the outward direction away from the center of the turning arc, which arouses unnatural feeling in the driver. Therefore, there is a limit to the increase of the derivative coefficient tau.

In a turn of a high lateral acceleration, provided that the steering conditions (the steering angle $\theta$ and the steering speed $\dot{\theta}$ are the same), it is necessary to make the opposite phase steering amount higher than the level required in the low lateral G range, in order to obtain the yawing characteristic of the same rank. FIG. 4 shows a characteristic of a tire cornering force. When the vehicle is in a turn of a low lateral G or in a straight ahead operation (in a range A' in FIG. 4), the side slip angle is still small, and the rate of increase of the cornering force with respect to the side slip angle (the slope of a tangent line a shown in FIG. 4) is high. When the lateral G is medium (a range B'), the side slip angle becomes greater, but the rate of increase (the slope of a tangent line b) becomes lower than that of the low G turn. When the lateral G is high (a range C'), the side slip angle reaches its maximum and then decreases, and the rate of increase of the cornering force (the slope of a tangent line c) is further decreased. During a turn of a high lateral G, therefore, the vehicle slip angle is large, and the cornering force produced per unit steer angle is low. Therefore, in the high lateral G range, it is desired to improve the yawing characteristic by increasing the opposite phase steering amount beyond the level of the low lateral G range. However, the control system of the conventional example cannot satisfy both of the demand for improving the yawing characteristic in the low lateral G range, and the demand for improving the yawing characteristic in the high lateral G range.

SUMMARY OF THE INVENTION

It is therefore an object of the present invention to provide a steering control system which can improve the steering response of yawing motion over a wide vehicle operation range from a low lateral acceleration to a high lateral acceleration.

According to the present invention, a steering control system for a vehicle comprises a rear steering actuator for varying an actual rear wheel steer angle of the vehicle in accordance with a control signal representing a desired rear wheel steer angle, a sensor means for sensing a steering angle of the vehicle, and a controller means for producing the control signal.

The controller means determines a first product by multiplying a time rate of change of the steering angle sensed by the sensor means, by a derivative coefficient tau, and produces the control signal in accordance with the first product. Furthermore, the controller means increases the derivative coefficient tau with increase of a variable which is the steering angle or the lateral acceleration of the vehicle when the variable is greater than a predetermined threshold value.

FIG. 5 shows one example of a basic arrangement of the control system according to the present invention. In this example, the controller means comprises a preparing means for generating a first input equal to or proportional to the steering angle $\theta$ and a second input representing the lateral acceleration, and a control signal generating means for receiving the first and second inputs as input signals, and generating the control signal in accordance with the first and second inputs so that the desired rear wheel steer angle represented by the control signal is proportional to a difference resulting from subtraction of a first product obtained by multiplying a time rate of change of the first input by the derivative coefficient tau which is positive, from a second product obtained by multiplying the first input by a proportional coefficient K. The control signal generating means comprises a derivative coefficient determining means for increasing the derivative coefficient tau in accordance with the second input when the second input is higher than a predetermined threshold value.

In the example of FIG. 5, the sensor means comprises a steering angle sensor for sensing the steering angle $\theta$ and a vehicle speed sensor for sensing a vehicle speed V of the vehicle. The controller means further comprises a differentiating means for determining the time rate of change of the first input, a proportional coefficient determining means for determining a value of the proportional coefficient K in accordance with the vehicle speed V, and a calculating means for calculating the desired rear wheel steer angle by using the first input, the time rate of change of the first input, the proportional coefficient K and the derivative coefficient tau. The derivative coefficient determining means comprises a first determining means for specifying a predetermined relationship between the derivative coefficient and the second input, in accordance with the vehicle speed, and a second determining means for determining a value of the derivative coefficient corresponding to a current value of the second input by using the relationship specified by the first determining means. The sensor means may further comprises a lateral acceleration sensor for sensing the lateral acceleration. In this case, the second input is proportional to the lateral acceleration sensed by the lateral acceleration sensor.

DETAILED DESCRIPTION OF THE INVENTION

Figure 1:
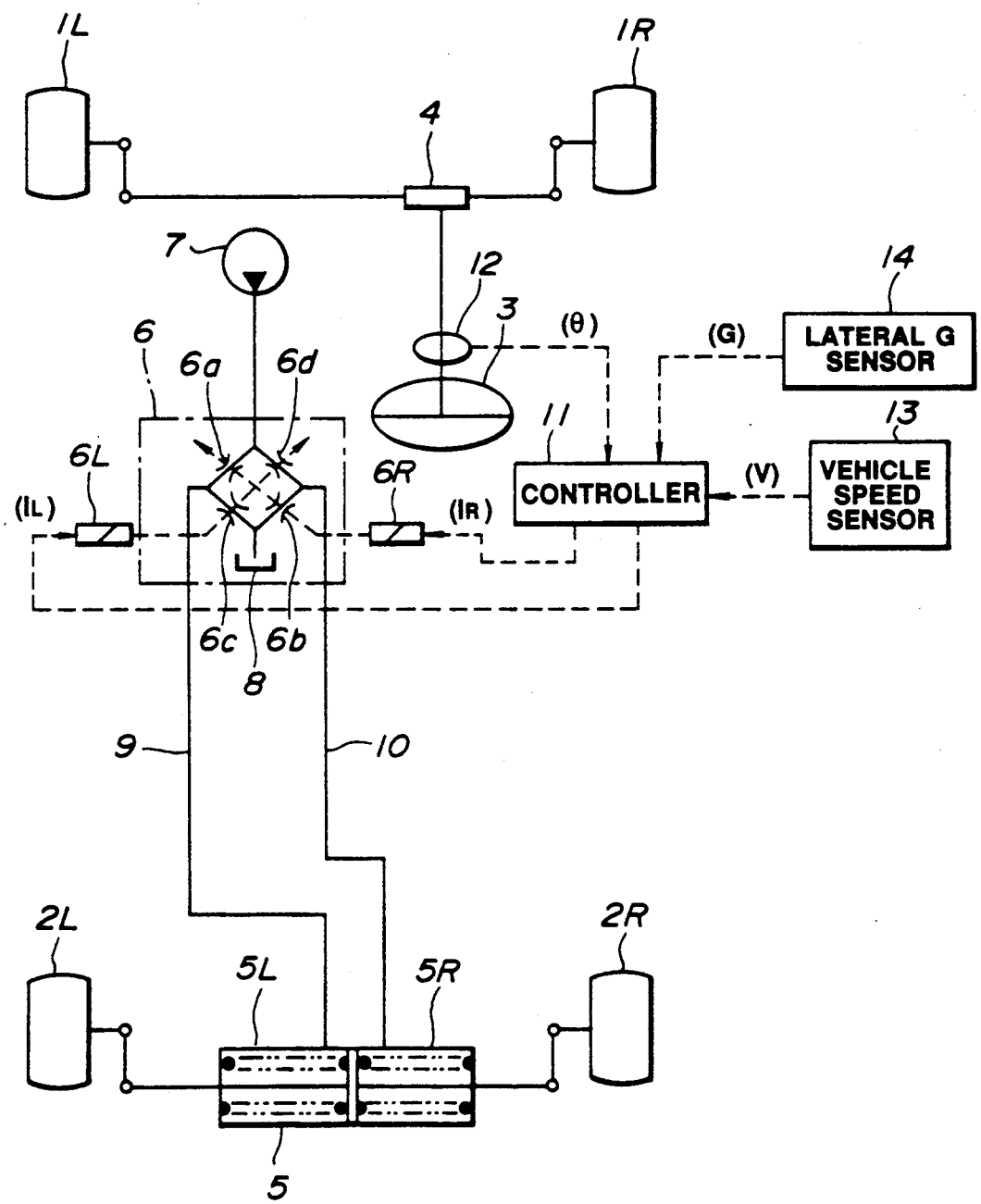
FIG. 1 is schematic view of a four wheel steering vehicle equipped with a control system according to one embodiment of the present invention.

FIG. 1 schematically shows a four wheel steering vehicle equipped with a control system according to one embodiment of the present invention.

This vehicle has left and right front wheels 1L and 1R, left and right rear wheels 2L and 2R, and a steering wheel 3. The front wheels 1L and 1R are connected with the steering wheel 3 through a conventional steering gear 4. Therefore, the front wheels 1L and 1R are steered so that a front wheel steer angle is substantially proportional to an angular displacement of the steering wheel 3. There is further provided a rear wheel steering actuator 5 for steering the left and right rear wheels 2L and 2R.

The rear wheel steering actuator 5 of this embodiment is a spring center type hydraulic actuator having left and right power chambers 5L and 5R. When an oil pressure is supplied to the right chamber 5R, then the actuator 5 steers the rear wheels 2L and 2R to the right through an angle proportional to the oil pressure. Similarly, the actuator 5 steers the rear wheels 2L and 2R to the left when the oil pressure is supplied to the left chamber 5L.

A rear wheel steering control valve 6 of an electromagnetic proportional type is connected with the actuator 5, and designed to control the oil pressures supplied to the left and right power chambers 5L and 5R of the actuator 5. The controlvalve 6 has four variable orifices 6a, 6b, 6c and 6d which are connected in a bridge circuit as shown in FIG. 1. Four junction points of the bridge circuit are connected, respectively, with a pump 7, a reservoir 8, a left oil conduit 9 leading to the left power chamber 5L, and a right oil conduit 10 leading to the right power chamber 5R. The control valve 6 further includes left and right solenoids 6L and 6R. When both solenoids 6L and 6R are off, a pair of the opposite orifices 6a and 6b, and a pair of the opposite orifices 6c and 6d are both fully opened, and accordingly, both power chambers 5L and 5R of the actuator 5 are held in a non-pressurized state. When the solenoid 6L or 6R is energized by a current $I_L$ or $I_R$, the orifices 6c and 6d or the orifices 6a and 6b are closed to a reduced opening degree corresponding to the magnitude of the exciting current $I_L$ or $I_R$, and accordingly the power chamber 5L or 5R is supplied with the oil pressure corresponding to the magnitude of the exciting current $I_L$ or $I_R$. In this way, the control valve 6 can vary the rear wheel steer angle by varying the oil pressure supplied to the actuator 5.

A controller 11 is connected with the solenoids 6L and 6R of the control valve 6, and designed to control the exciting currents $I_L$ and $I_R$.

A group of sensors are connected with the controller 22. In this embodiment, the sensors are steering angle sensor 12, a vehicle speed sensor 13, and a lateral acceleration sensor 14. The steering angle sensor 12 of this embodiment is a steering wheel angle sensor for sensing a steering wheel angle $\theta$. The vehicle speed sensor 13 senses a vehicle speed V of the vehicle. The lateral acceleration sensor 14 senses a lateral acceleration G of the vehicle. Outputs of these sensors are all inputted into the controller 11. In the present invention, it is possible to omit the lateral acceleration sensor 14, and use the steering angle $\theta$ in place of the output signal of the lateral acceleration sensor 14.

Figure 2:
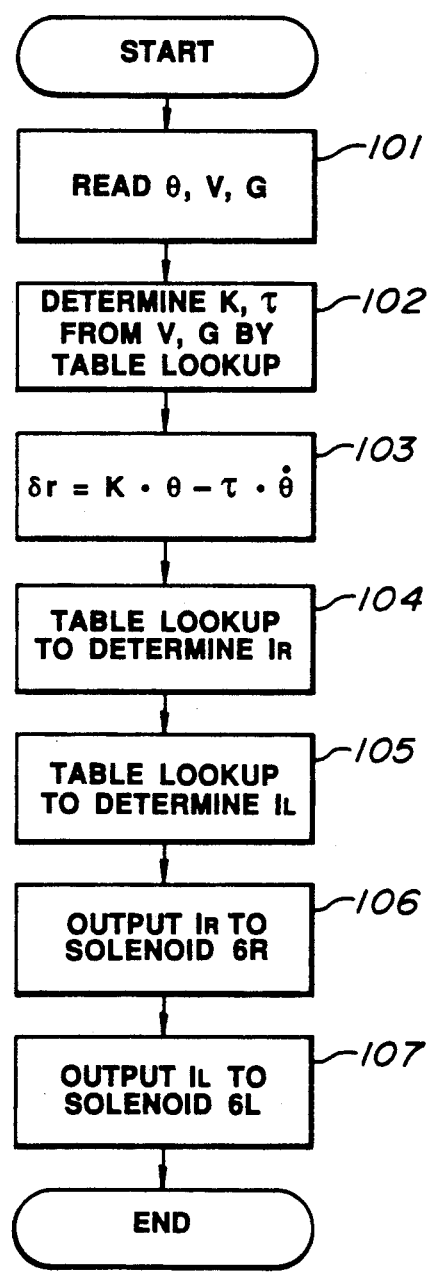
FIG. 2 is a flowchart showing a rear wheel steer angle control procedure performed by the control system shown in FIG. 1.

FIG. 2 shows a procedure to control the rear wheel steer angle.

At a first step 101, the controller 11 reads current values of the steering angle $\theta$, the vehicle speed V and the lateral acceleration G (which is approximately equal to a centripetal acceleration).

At a step 102, the controller 11 determines a value of a proportional coefficient K corresponding to the current value of the vehicle speed V by the table lookup, and further determines a value of a derivative coefficient tau corresponding to the current values of the vehicle speed V and the lateral acceleration G by the table lookup. The proportional and derivative coefficient K and tau are so determined as to make flat the characteristic of the yaw rate gain with respect to the steering frequency.

At a step 103, the controller 11 determines a desired rear wheel steer angle $\delta_r$ in accordance with $\delta_r = K \times \theta - \tau \dot{\theta}$, by using the values of the proportional coefficient K and derivative coefficient tau determined at the step 102, the current value of the steering angle $\theta$ and a current value of a steering angular speed $\dot{\theta}$ (the first derivative of the steering angle $\theta$ with respect to time). At steps 104 and 105, the controller 11 determines the solenoid exciting currents $I_R$ and $I_L$ required to achieve the thus-determined desired rear wheel steer angle, by the table lookup. At steps 106 and 107, the controller 11 delivers the exciting currents $I_R$ and $I_L$ determined at the steps 104 and 105, to the solenoids 6R and 6L of the control valve 6. Therefore, the rear wheel steering actuator 5 steers the rear wheels 2L and 2R so that the actual rear wheel steer angle is held equal to the desired rear wheel steer angle.

Figure 3:
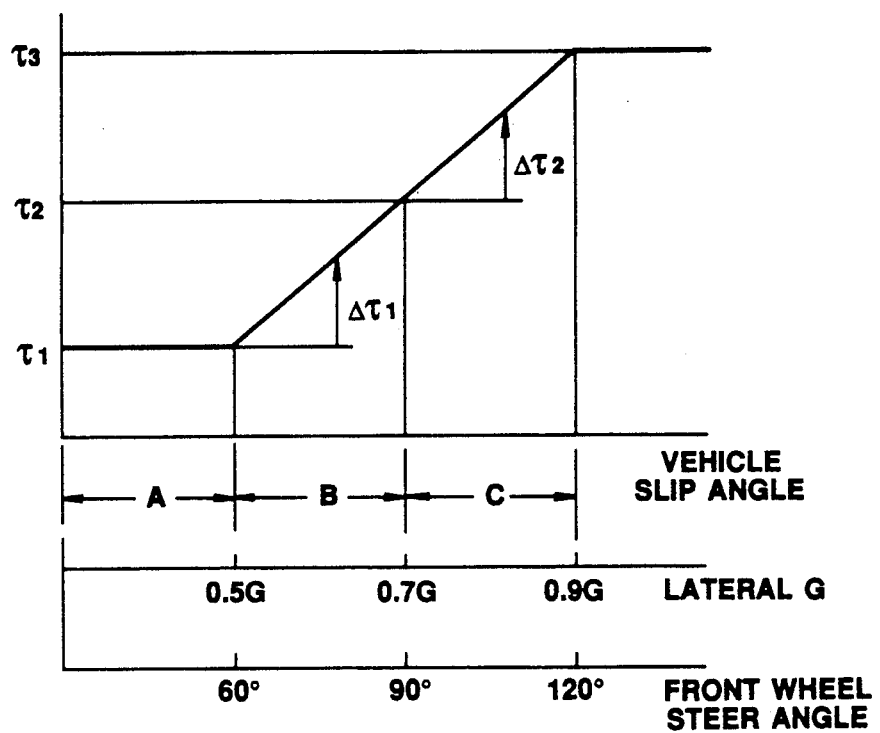
FIG. 3 is a graph showing a pattern of characteristic of a derivative coefficient used in the control system shown in FIG. 1, with respect to a vehicle lateral acceleration and other variables.
Figure 4:
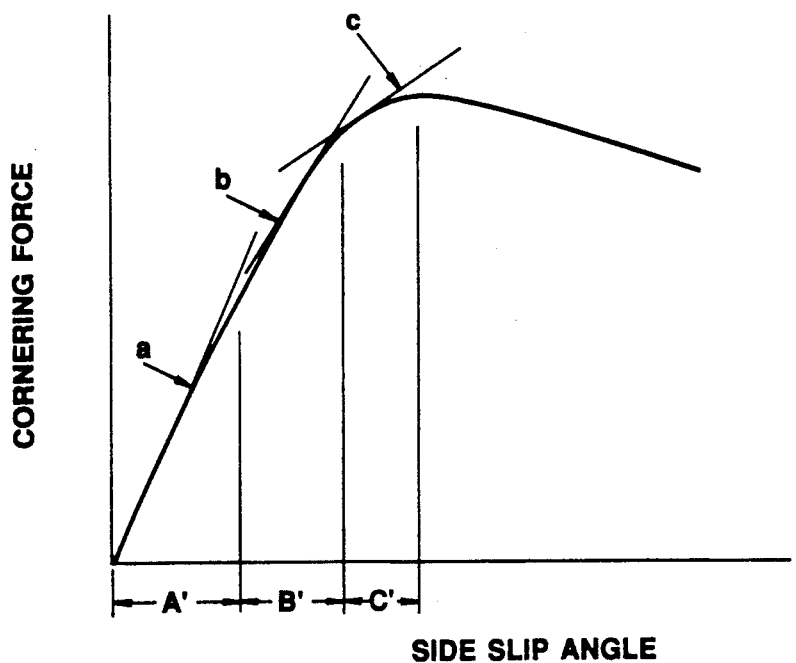
FIG. 4 is graph of a characteristic of a cornering force.
Figure 5:
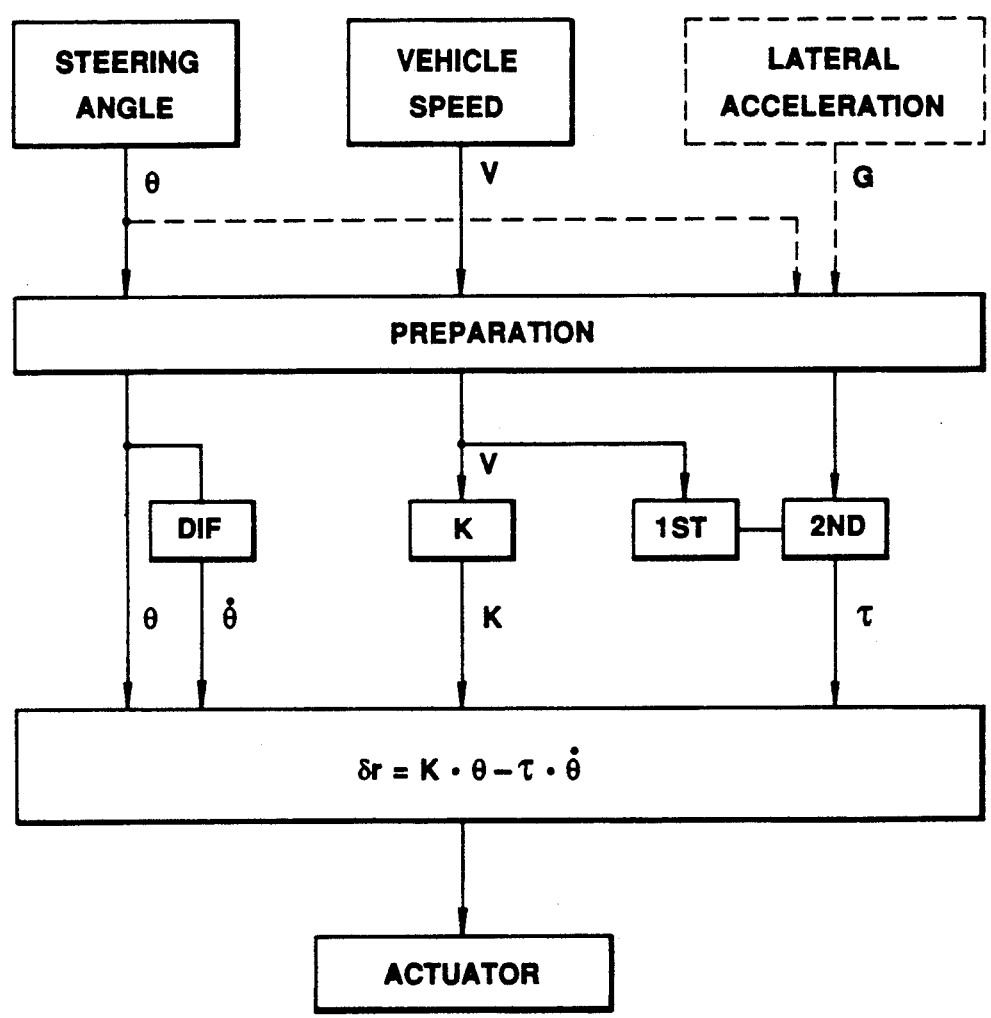
FIG. 5 is a block diagram schematically showing, as an example, an arrangement of constituent elements of the control system of the present invention.

The controller 11 of this embodiment includes a memory section for storing a plurality of maps prepared for a plurality of predetermined different vehicle speed values so that each of the maps is assigned to a unique one of the predetermined different vehicle speed values, (or a unique one of intervals of the vehicle speed V). FIG. 3 shows one of the maps. The map shown in FIG. 3 has a low lateral G range A corresponding to the low side slip angle range A' in FIG. 4, a medium lateral G range B corresponding to the medium side slip range B', and a high lateral G range C corresponding to the high side slip angle range C'. In the low lateral acceleration range A in which the lateral acceleration G is equal to or lower than a predetermined first value $G_1$ (which is a threshold value) ($G \leq G_1$), the derivative coefficient tau is fixed at a lower constant $\tau_1 (\tau = \tau_1)$. The lower constant $\tau_1$ is a constant whose value increases as the vehicle speed decreases. The lower constant $\tau_1$ is determined so as to provide an adequate yawing characteristic in the low lateral acceleration range. In the medium lateral acceleration range B in which the lateral acceleration G is higher than the first value $G_1$ but it is equal to or lower than a predetermined second value $G_2$ ($G_1 < G \leq G_2$), the derivative coefficient tau is increased as the lateral acceleration G (or the front wheel steer angle) increases. In this embodiment, the derivative coefficient tau in the medium G range is increased by adding a correction quantity $\Delta\tau_1$, to the lower constant $\tau_1 (\tau = \tau_1 + \Delta\tau_1)$. The correction quantity $\Delta\tau_1$ is equal to or greater than zero, and equal to or smaller than $\tau_2 - \tau_1$ ($0 \leq \Delta\tau_1 \leq \tau_2 - \tau_1$). The correction quantity $\Delta\tau_1$ is increased in proportion to lateral acceleration G (or the front wheel steer angle). In the high lateral acceleration range C in which the lateral acceleration G is higher than $G_2$ but equal to or lower than a third predetermined value $G_3$ ($G_2 < G \leq G_3$), the derivative coefficient tau is increased similarly as the lateral acceleration (or the front wheel steer angle) increases, by adding a correction quantity $\Delta\tau_2$ ($\tau = \tau_2 + \Delta\tau_2$). The correction quantity $\Delta\tau_2$ is equal to or greater than zero but equal to or smaller than $\tau_3 - \tau_2 (0 \leq \Delta\tau_2 \leq \tau_3 - \tau_2)$, and increased in proportion to the lateral acceleration G (or the front wheel steer angle). When the lateral acceleration G is higher than the third value $G_3$ (which is a saturation value), the derivative coefficient tau is fixed at the upper limit value $\tau_3 (\tau = \tau_3)$. In this example, the first lateral acceleration value $G_1$ is equal to 0.5 (G), and the corresponding front wheel steer angle is equal to 60 degrees. The second lateral acceleration value $G_2$ and the corresponding front wheel steer angle are 0.7 (G), and 90 degrees. The third lateral acceleration value $G_3$ and the corresponding front wheel steer angle are 0.9 (G) and 120 degrees.

In this example, the rate of increase of the derivative coefficient tau is not changed between the medium and high G ranges, and the derivative coefficient tau is increased from the lower value $\tau_1$ to the upper value $\tau_3$ along a continuous straight line, as shown in FIG. 3. However, it is optional to make the rate of increase of tau higher in the high G range than in the medium G range in order to further enhance the yawing characteristic in the high G range.

In this way, the control system of the present invention is arranged to increase the opposite phase steering amount of the rear wheels with increase in the lateral acceleration or the front wheel steer angle by varying the derivative coefficient in accordance with the turning condition of the vehicle. Therefore, this control system can improve the yawing characteristic of the vehicle over the wide range of the lateral acceleration from the low lateral G to the high lateral G.

What is claimed is:

1. A steering control system for a vehicle, comprising;
   a rear steering actuator for varying an actual rear wheel steer angle of said vehicle in accordance with a control signal representing a desired rear wheel steer angle,
   sensor means for sensing a steering angle of said vehicle,
   controller means for determining a first product by multiplying a time rate of change of said steering angle by a derivative coefficient, and producing said control signal in accordance with said first product, said controller means increasing said derivative coefficient with increase in a variable which is one of said steering angle and a lateral acceleration of said vehicle when said variable is greater than a predetermined threshold value.

2. A steering control system for a vehicle, comprising;
- a rear steering actuator for varying an actual rear wheel steer angle of said vehicle in accordance with a control signal representing a desired rear wheel steer angle,
- sensor means for sensing a steering angle of said vehicle,
- controller means connected with said sensor means, said controller means comprising preparing means for generating a first input signal proportional to said steering angle, and a second input signal representing a lateral acceleration of said vehicle, and control signal generating means for generating said control signal in accordance with said first and second input signals so that said desired rear wheel steer angle represented by said control signal is proportional to a difference resulting from subtraction of a first product obtained by multiplying a time rate of change of said first input signal by a derivative coefficient, from a second product obtained by multiplying said first input signal by a proportional coefficient, said generating means comprising derivative coefficient determining means for increasing said derivative coefficient in accordance with said second input signal when said second input signal is higher than a predetermined threshold value.

3. A steering control system according to claim 2 wherein said sensor means comprises a steering angle sensor for sensing said steering angle and a vehicle speed sensor for sensing a vehicle speed of said vehicle, and said derivative coefficient determining means determines a value of said derivative coefficient corresponding to a current value of said second input signal by using a predetermined relationship between said derivative coefficient and said second input signal in which said derivative coefficient remains equal to a lower constant value when said second input signal is lower than said threshold value, said derivative coefficient increases monotonically with increase in said second input signal when said second input signal is higher than said threshold value and lower than a predetermined saturation value, and said derivative coefficient remains equal to an upper constant value when said second input signal is higher than said saturation value, said derivative coefficient determining means determining a specific form of said relationship in accordance with said vehicle speed, and using said specific form for determining said derivative coefficient.

4. A steering control system according to claim 3 wherein said derivative coefficient determining means comprises first determining means for storing plurality of specific forms of said relationship between said derivative coefficient and said second input signal and selecting one of said specific forms in accordance with said vehicle speed, and second determining means for determining a value of said derivative coefficient by using one of said specific forms selected by said first determining means.

5. A steering control system according to claim 4 wherein said second input signal is proportional to a variable which is one of said steering angle and said lateral acceleration.

6. A steering control system according to claim 5 wherein said steering angle is a front wheel steer angle of said vehicle, and said second input signal is equal to said steering angle.

7. A steering control system according to claim 5 wherein said sensor means further comprises a lateral acceleration sensor for sensing said lateral acceleration, and said second input signal is proportional to said lateral acceleration.

8. A steering control system according to claim 1, wherein said controller means comprises derivative coefficient determining means which changes said derivative coefficient immediately when said variable changes.

9. A steering control system according to claim 1, wherein said controller means comprises derivative coefficient determining means for varying said derivative coefficient in dependence on said variable so that to each instantaneous value of said variable, there corresponds one value of said derivative coefficient.

10. A steering control system according to claim 1, wherein said controller means comprises derivative coefficient determining means for increasing said derivative coefficient instantaneously with increase in said steering angle said steering angle being a front wheel steer angle of the vehicle.

11. A steering control system according to claim 1, wherein said controller means comprises derivative coefficient determining means for increasing said derivative coefficient instantaneously with increase in said lateral acceleration.

12. A steering control system according to claim 2, wherein said sensor means comprises a steering angle sensor for sensing said steering angle, said steering angle being a front wheel steer angle of the vehicle, sand said derivative coefficient determining means increasing said derivative coefficient instantaneously with increases in said steering angle.

13. A steering control system according to claim 2, wherein said sensor means comprises a steering angle sensor for sensing said steering angle, and a lateral acceleration sensor for sensing said lateral acceleration of the vehicle, and said derivative coefficient determining means increasing said derivative coefficient instantaneously with increases in said lateral acceleration.

* * * * *